US009298662B2

(12) United States Patent
Campbell et al.

(10) Patent No.: US 9,298,662 B2
(45) Date of Patent: Mar. 29, 2016

(54) PROVIDING EXPANSION CARD SETTINGS

(75) Inventors: Keith M. Campbell, Cary, NC (US);
Patrick L. Caporale, Cary, NC (US);
Caroline M. Metry, Cary, NC (US);
Pravin Patel, Cary, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 1691 days.

(21) Appl. No.: 12/633,441

(22) Filed: Dec. 8, 2009

(65) Prior Publication Data
US 2011/0138095 A1    Jun. 9, 2011

(51) Int. Cl.
*G06F 13/00* (2006.01)
*G06F 13/40* (2006.01)

(52) U.S. Cl.
CPC ..................... *G06F 13/409* (2013.01)

(58) Field of Classification Search
USPC .................................... 710/10, 104
See application file for complete search history.

(56) References Cited

U.S. PATENT DOCUMENTS

| | | | |
|---|---|---|---|
| 5,359,719 A | 10/1994 | Chang et al. | |
| 6,688,910 B1 | 2/2004 | Macauley | |
| 6,724,635 B2* | 4/2004 | Larson et al. | 361/736 |
| 6,915,362 B2* | 7/2005 | Ramsey et al. | 710/62 |
| 6,968,414 B2 | 11/2005 | Abbondanzio et al. | |
| 7,051,215 B2* | 5/2006 | Zimmer et al. | 713/300 |
| 7,164,656 B2* | 1/2007 | Foster et al. | 370/235 |
| 7,181,604 B2* | 2/2007 | King et al. | 713/1 |
| 7,225,247 B2* | 5/2007 | Kennedy et al. | 709/223 |
| 7,302,593 B2* | 11/2007 | Rothman et al. | 713/300 |
| 7,398,401 B2* | 7/2008 | Goud et al. | 713/300 |
| 7,444,532 B2* | 10/2008 | Masuyama et al. | 713/330 |
| 7,793,089 B2* | 9/2010 | Leigh et al. | 713/1 |
| 7,796,589 B2* | 9/2010 | Cohen et al. | 370/389 |
| 7,930,440 B2* | 4/2011 | Leigh et al. | 710/8 |
| 8,140,871 B2* | 3/2012 | Abdul et al. | 713/310 |
| 8,161,309 B2* | 4/2012 | Brown et al. | 713/330 |
| 2006/0026325 A1 | 2/2006 | Huang et al. | |
| 2009/0055665 A1* | 2/2009 | Maglione et al. | 713/320 |

OTHER PUBLICATIONS

Preboot Execution Environment (PXE) Specification Version 2.1 Sep. 20, 1999, Intel Corporation.*

* cited by examiner

*Primary Examiner* — Paul R Myers
(74) *Attorney, Agent, or Firm* — Katherine S. Brown; Jeffrey L. Streets

(57) ABSTRACT

Settings are provided by a chassis management controller to an expansion card in a multi-slot server chassis. The chassis management controller in a multi-slot server chassis provides an operating parameter to a server management controller in a server, and the server management controller writes the operating parameter to a port expander of an expansion card installed on the server. The operating parameter is written to the port expander prior to expansion card power up, and the expansion card uses the operating parameter after power up to derive one or more SERDES value. The SERDES value is used to program an ASIC chip comprising a SERDES converter on the expansion card. In one example, the operating parameter is determined by the capabilities of a chassis midplane at the slot where the compute node is installed.

17 Claims, 3 Drawing Sheets

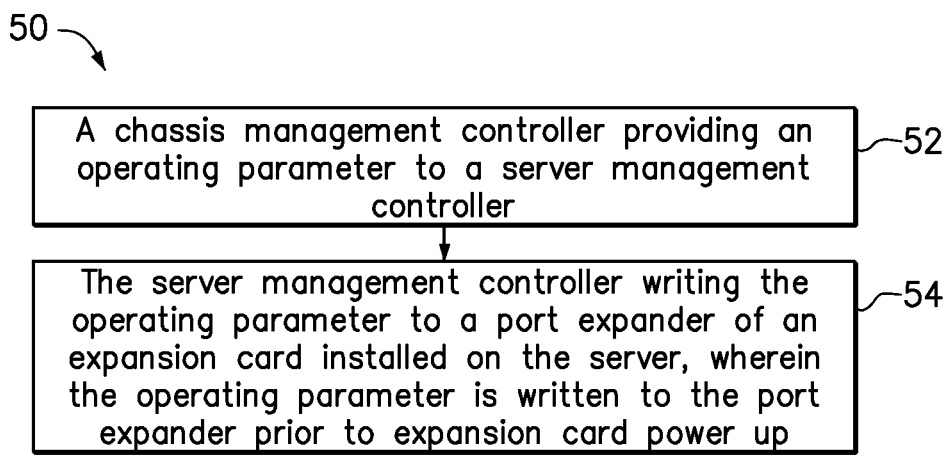

PROVIDING EXPANSION CARD SETTINGS

BACKGROUND

1. Field of the Invention

The present invention relates to methods for providing expansion card settings, and more specifically to influencing expansion card behavior based on the operating environment.

2. Background of the Related Art

An expansion card is a printed circuit board that can be inserted into an expansion slot of a computer motherboard to add additional functionality to a computer system. One edge of the expansion card includes an edge connector that fits exactly into the slot. The edge connector and slot establish the electrical contact between the electronic components on the card and the electronic components on the motherboard.

Expansion cards may be installed in many different operating environments, including blade servers. A blade server is a server computer having a modular design optimized to minimize the use of physical space. Whereas a standard rack mount server can function with a power cord and network cable, blade servers have many components removed for the purpose of saving space, minimizing power consumption and other considerations, while still having all the functional components to be considered a computer. A multi-slot chassis can hold multiple blade servers and provide services such as power, cooling, networking, various interconnects and management.

Although a blade server can be given new functions or increased capabilities by the installation of an expansion card on the blade server, the chassis hardware may then become the limiting factor in overall performance of the blade server. For example, newer and faster network interfaces, such as 8-bit Fibre Channel technology, may be introduced in a blade server by installing a corresponding expansion card. However, the individual slot or entire chassis in which the expansion card is installed may not support the faster network speeds, leading to various communication errors. One option for eliminating these errors is to provide updated hardware to the chassis or at least the chassis midplane that communicates the blade server I/O with a network switch. Another option is to restrict the placement of a blade server having high speed I/O to only those slots that are known to support the new expansion card capabilities. These options are taken only at the expense of a greater capital investment or the loss of flexibility in installing and relocating the server blades as desired.

BRIEF SUMMARY

One embodiment of the present invention provides a method for determining settings to be used by an expansion card in a multi-slot server chassis. The method comprises a chassis management controller in a multi-slot server chassis providing a parameter of an operating environment to a server management controller in a server that is installed in one of the slots of the multi-slot server chassis. The method further comprises the server management controller providing the parameter to a port expander of an expansion card installed on the server, wherein the parameter is written to the port expander prior to expansion card power up.

In one optional embodiment, the method further comprises the expansion card storing vital product data including a capability bit, wherein the capability bit indicates that the server management controller can provide a parameter to the expansion card port expander. The server management controller reads the capability bit and then, in response to the capability bit having a value indicating to the server management controller that the expansion card includes the port expander, the server management controller provides a parameter of the operating environment to a port expander of the expansion card. In yet another optional embodiment, the method further comprises, upon power up of the expansion card, the expansion card using the parameter to derive a SERDES value and programming an ASIC chip comprising a SERDES converter to use the derived SERDES value.

BRIEF DESCRIPTION OF THE SEVERAL VIEWS OF THE DRAWINGS

FIG. 2 is a table representing the contents of an 8-bit port expander in an expansion card.

FIG. 3 is a flowchart of a method according to a first embodiment of the present invention.

DETAILED DESCRIPTION

One embodiment of the present invention provides a method for determining settings to be used by an expansion card in a multi-slot server chassis. The method comprises a chassis management controller in a multi-slot server chassis providing a parameter of an operating environment to a server management controller in a server that is installed in one of the slots of the multi-slot server chassis. The method further comprises the server management controller providing the parameter to a port expander of an expansion card installed on the server, wherein the parameter is written to the port expander prior to expansion card power up. Optionally, the port expander is an 8-bit port expander connected to an I2C bus on the expansion card.

In another optional embodiment, the method further comprises, upon power up of the expansion card, the expansion card using the parameter to derive a SERDES value and programming an ASIC chip comprising a SERDES converter to use the derived SERDES value. For example, the parameter of the operating environment may include identification of the chassis and slot in which the expansion card is installed. In another example, the parameter may include one or more communication parameters supported by the slot in the chassis, such as parameters determined by the capabilities of a chassis midplane at the slot where the compute node is installed. Accordingly, the expansion card may be an interface card for a storage network, such as a Fibre Channel card, or an interface card for a local area network, such as an Ethernet card. In further embodiments, the parameter may include one or more software keys contained in the chassis management controller to enable or disable features, encryption information used for secure communications, or instructions for the expansion card to enter a power savings mode.

In yet another optional embodiment, the method further comprises the expansion card storing vital product data including a capability bit, wherein the capability bit indicates that the server management controller can provide or write a parameter to the expansion card port expander. The server management controller reads the capability bit and then, in response to the capability bit having a value indicating to the server management controller that the expansion card includes the port expander, the server management controller provides the parameter to a port expander of the expansion card.

Figure 1:
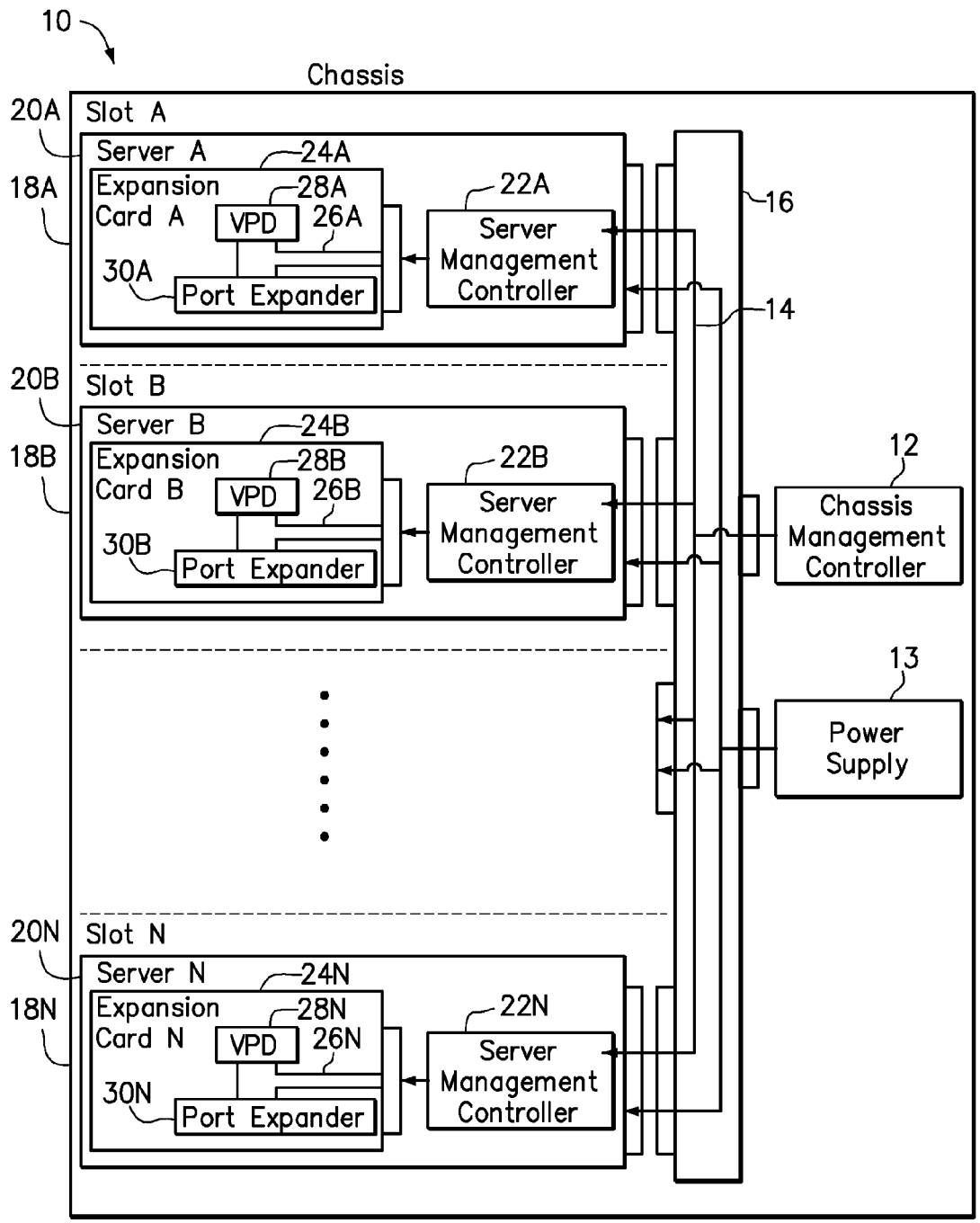
FIG. 1 is a block diagram of a multi-slot server chassis including a chassis management controller in communication with a plurality of servers.

FIG. 1 is a block diagram of a multi-slot server chassis 10 including a chassis management controller 12 in communication with a plurality of servers 20A-20N. The chassis management controller 12 communicates with server management controllers 22A-22N over a system management bus (SMBus) or intelligent platform management bus (IPMB) 14. The management bus 14 is extended through a midplane 16 within the chassis 10 and provides connections in alignment with a plurality of slots 18A-18N, where each slot provides physical and electronic support for one of the servers. The midplane 16 and its connections also provide for the deliver of power from a power supply 13 to each server. It should also be recognized that the midplane 16 preferably also includes network connections to each slot so that each server may communicate over one or more network, such as an Ethernet local area network or a storage area network (not shown). For example, the system may implement a storage area network based on 8 Gb Fibre Channel technology.

One or more of the servers may further include an expansion card 24A-24N secured to a motherboard (not shown) within the server that includes the server management controller 22A-22N. Accordingly, each server management controller 22A-22N can communicate with the expansion card 24A-24N, respectively, for example by communicating over a serial computer bus 26A-26N, such as an inter-integrated circuit (I2C) bus. As shown, the serial computer bus 26A-26N provides communication with a non-volatile data storage device including vital product data (VPD) 28A-28N and a port expander 30A-30N for the storage of an operating environment parameter in accordance with one of more embodiments of the present invention.

The methods of the present invention may be performed in various systems, including the system described in reference to FIG. 1. Therefore, the chassis management controller 12 may notify a server management controller 22A-22N, which in turn notifies the expansion card 24A-24N of an operating environment parameter, such as chassis type and slot information, for storage in the port expander 30A-30N. In this manner, the behavior of the expansion card can be adjusted on the basis of the operating environment, if required. For example, if the expansion card is an 8 Gb Fibre Channel card providing communications over a storage area network, the I/O signaling may be adjusted to optimize communication integrity in view of parameters relating to the midplane and/or other chassis hardware. Because these parameters may vary from one slot to the next within the chassis, the present systems and methods enable the chassis management controller to provide each server and its expansion card with information about these parameters in order for the expansion card to adjust its performance and reduce the occurrence of communications errors.

In other optional embodiments, the parameters provided to the expansion card may also include any software keys contained in the chassis management controller to enable/disable features, as well as encryption information. Any information that could influence, lock or unlock behaviors in the expansion card could be transferred using the present methods. These methods may allow a more centralized management of features and behavior, if desired. The expansion card can also use the information to independently determine how to behave, if unique behavior based on operating environment is needed. The present methods may also be used to notify the expansion card to enter a power savings mode or "throttle" in order to save power for the system. The power management for the system may be initiated by the chassis management module, while some power management functions are pushed down to the server, and then to the daughter card using these methods.

FIG. 2 is a table representing the contents of an 8-bit port expander in an expansion card. In the embodiment shown, the 8-bit port expander 40 is divided into a 4-bit slot identification portion 42 including bits 4-7 and a 4-bit chassis identification portion 44 including bits 0-3. This information is preferably written into the port expander prior to expansion card power up, yet the port expander has access to 3.3 v auxiliary (AUX) power. Furthermore, the port expander may include an 8 bit address (D0) for writing an operating parameter received from the server management controller and an 8 bit address (D1) for reading the derived SERDES values back to a serializer/deserializer (SERDES), such as application specific integrated circuit (ASIC) in a network interface card. Optionally, the port expander may be provided by a Motorola 6800 microchip.

FIG. 3 is a flowchart of a method according to a first embodiment of the present invention. The method 50 comprises a chassis management controller providing an operating parameter to a server management controller, in step 52, and the server management controller writing the operating parameter to a port expander of an expansion card installed on the server, in step 54, wherein the operating parameter is written to the port expander prior to expansion card power up.

Figure 4:
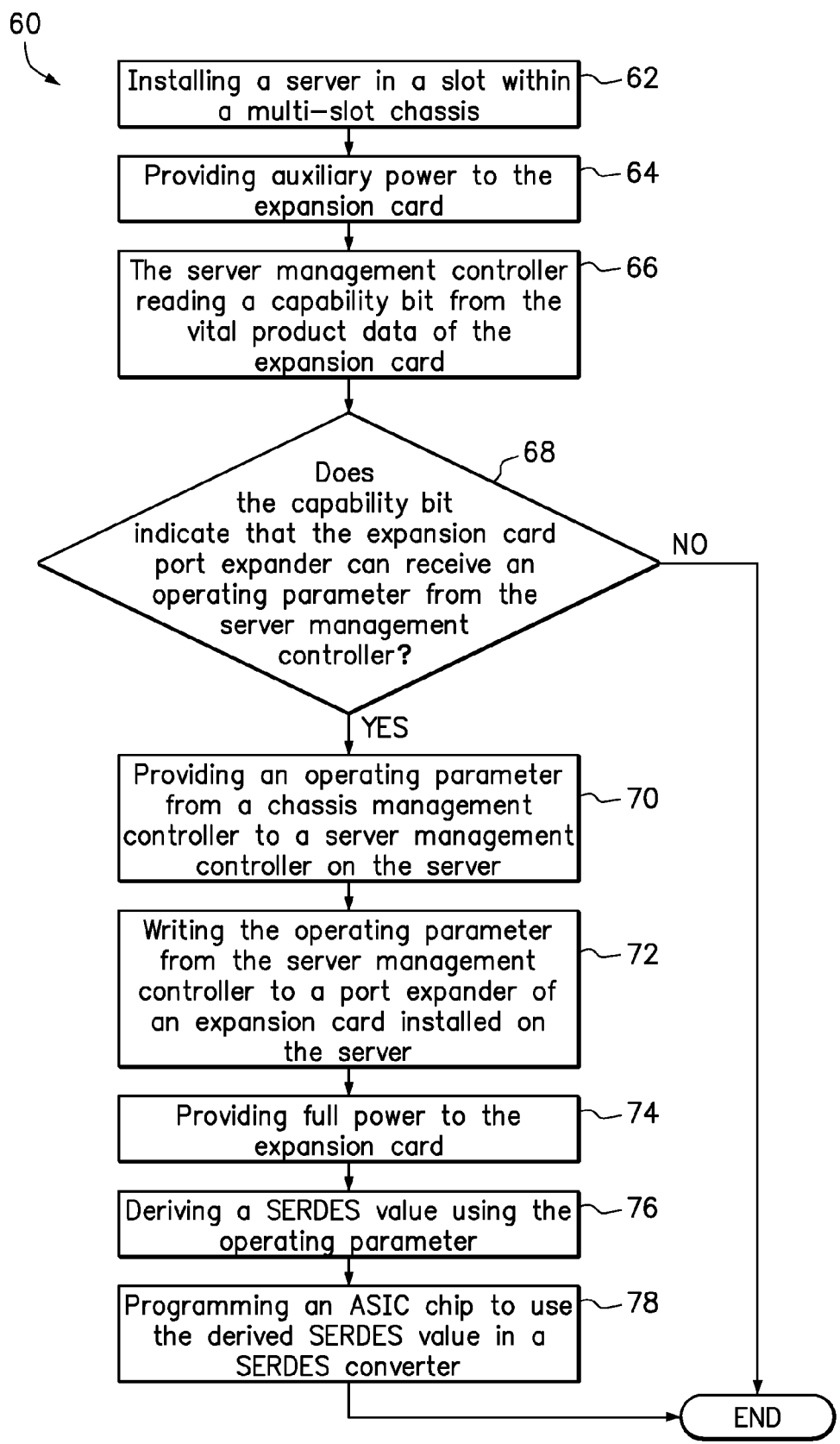
FIG. 4 is a flowchart of a method according to a second embodiment of the present invention.

FIG. 4 is a flowchart of a method according to a second embodiment of the present invention. The method 60 includes installing a server in a slot within a multi-slot chassis as set out in step 62. In step 64, auxiliary power is provided to the expansion card. The server management controller then reads a capability bit from the vital product data of the expansion card in step 66. A determination is then made by a chassis management controller, in step 68, whether the capability bit indicates that the expansion card has a port expander that can receive an operating parameter from the server management controller. If the expansion card does not have this capability, then the method ends.

If the expansion card capability bit indicates that the expansion card is able to receive an operating parameter from the server management controller, then in step 70 an operating parameter is provided from the chassis management controller to a server management controller on the server. In step 72, the operating parameter is written from the server management controller to a port expander of an expansion card installed on the server. Accordingly, at some subsequent point in time, the expansion card is provided with full power in step 74. The expansion card then uses the operating parameter to derive a SERDES value in step 76 and programs an ASIC chip to use the derived SERDES value in a SERDES converter in step 78.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   a chassis management controller in a multi-slot server chassis providing an operating parameter to a server management controller in a server that is installed in one of the slots of the multi-slot server chassis;
   the server management controller writing the operating parameter to a port expander of an expansion card installed on the server, wherein the operating parameter is written to the port expander prior to expansion card power up, and wherein the operating parameter is determined by the capabilities of a chassis midplane and includes a communication parameter supported by the slot in the chassis; and
   the expansion card using the operating parameter to derive a SERDES value.

2. The method of claim 1, wherein the operating parameter includes identification of the chassis and slot in which the expansion card is installed.

3. The method of claim 1, further comprising:
   the expansion card programming an ASIC chip comprising a SERDES converter to use the SERDES value.

4. The method of claim 1, wherein the expansion card is an interface card for a local area network.

5. The method of claim 4, wherein the interface card is an Ethernet card.

6. The method of claim 1, wherein the operating parameter is stored in the port expander.

7. The method of claim 6, wherein the port expander is an 8-bit port expander.

8. The method of claim 6, wherein the port expander in connected to an I2C bus on the expansion card.

9. The method of claim 1, wherein the operating parameter includes a software key contained in the chassis management controller to enable or disable a feature of the expansion card.

10. The method of claim 1, wherein the operating parameter includes encryption information.

11. The method of claim 1, wherein the operating parameter instructs the expansion card to enter a power savings mode.

12. The method of claim 1, wherein the multi-slot server chassis is a blade server chassis.

13. The method of claim 1, further comprising:
   the expansion card storing vital product data including a capability bit, wherein the capability bit indicates that the server management controller can write to the expansion card port expander;
   the server management controller reading the capability bit; and
   the server management controller writing one or more operating parameter to the port expander of the expansion card in response to the capability bit having a value indicating to the server management controller that the expansion card includes the port expander.

14. The method of claim 1, wherein the server and expansion card are provided with auxiliary power prior to power up.

15. A method comprising:
   a chassis management controller in a multi-slot server chassis providing an operating parameter to a server management controller in a server that is installed in one of the slots of the multi-slot server chassis; and
   the server management controller writing the operating parameter to a port expander of an expansion card installed on the server, wherein the operating parameter is written to the port expander prior to expansion card power up, and wherein the expansion card is an interface card for a storage network; and
   the expansion card using the operating parameter to derive a SERDES value.

16. The method of claim 15, wherein the operating parameter includes a communication parameter supported by the slot in the chassis.

17. The method of claim 15, wherein the interface card is a Fibre Channel card.

* * * * *